No. 11,816. Reissued Apr. 3, 1900.
G. HILLIGER.
APPARATUS FOR BURNING COAL DUST.
(Application filed Jan. 18, 1900.)
Fig. 1.
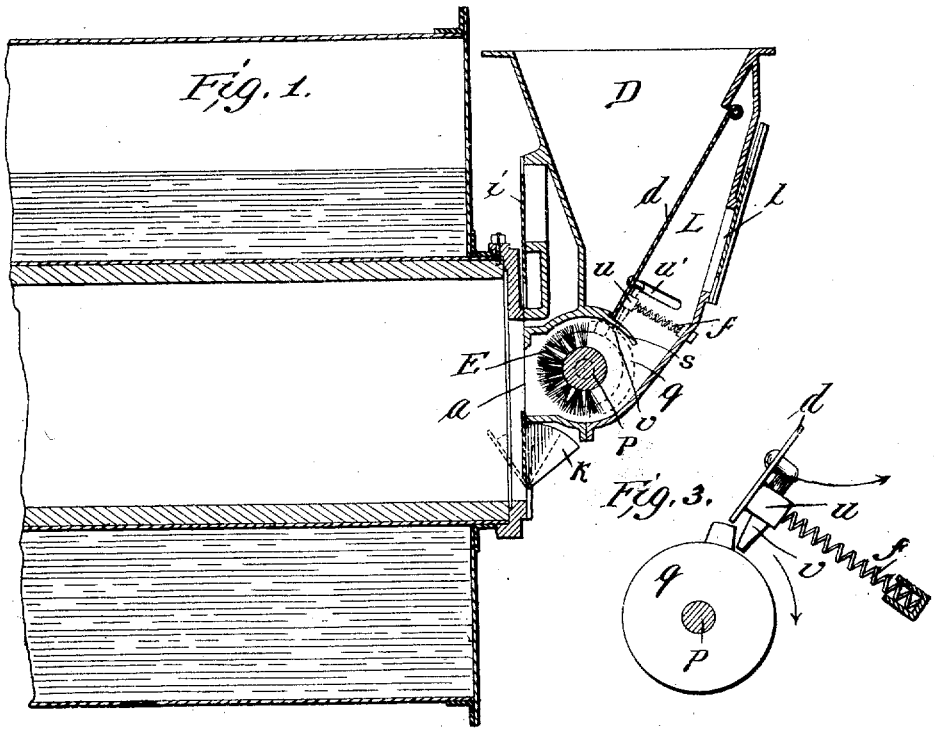
Fig. 3.
Fig. 2.
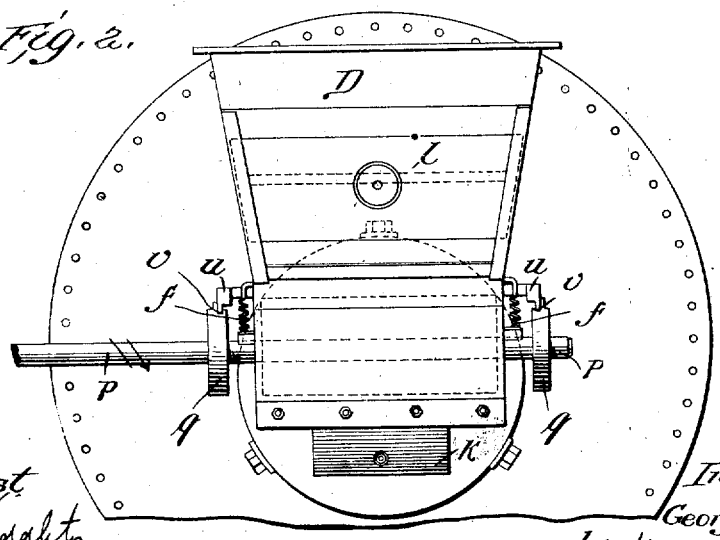
Attest,
F. L. Middleton
C. Mannaman
Inventor
Georg Hilliger
by Spear & Seely
Atty

UNITED STATES PATENT OFFICE.

GEORG HILLIGER, OF BERLIN, GERMANY, ASSIGNOR TO RICHARD SCHWARTZKOPFF, OF SAME PLACE.

APPARATUS FOR BURNING COAL-DUST.

SPECIFICATION forming part of Reissued Letters Patent No. 11,816, dated April 3, 1900.

Original No. 558,875, dated April 21, 1896. Application for reissue filed January 18, 1900. Serial No. 1,958.

*To all whom it may concern:*

Be it known that I, GEORG HILLIGER, engineer, a subject of the King of Prussia, German Emperor, and a resident of Thurmstrasse 28, Berlin, in the Empire of Germany, have invented a new and useful Improved Apparatus for Using Coal-Dust for Burning Purposes, (which was patented in Germany November 27, 1892, No. 75,909; in England June 8, 1893, No. 11,286; in Italy September 23, 1893, No. 34,863; in Austria October 13, 1893, No. 36,006; in Hungary October 13, 1893, No. 56,185; in Belgium November 11, 1893, No. 107,136. and in Spain January 20, 1894, No. 15,168,) of which the following is a full, clear, and exact description.

This invention relates to a furnace arranged for the combustion of coal-dust, which is conveyed into the combustion-chamber by means of a revolving brush, such mechanical introduction and distribution of the fuel in the condition of dust by reason of its simplicity and reliability being far superior to any of the existing arrangements for the combustion of coal-dust, in which, unlike that which takes place according to the present invention, the pulverulent fuel is fed to the furnace by means of a blast or by steam through twyers or injectors.

The invention will be best understood by reference to the accompanying drawings, in which—

Figures 1 and 2 are respectively a section and a front view of a furnace constructed in accordance with my invention and in which the rotating brush is combined and adapted to be operated simultaneously with a vibrating or shaking arrangement, whose object is to prevent the coal-dust from agglomerating into clots or lumps, so that it may be conveyed by the revolving brush to the furnace in a continuous and uniform manner without any obstructions taking place. Fig. 3 is a partial detail view of the cam and tappet-arm, being accesssory parts of the vibrating plate.

The furnace-chamber A, constructed with fire-brick walls, contains no grate and is limited at the rear end by a bridge-wall of ordinary construction. (Not shown.) The lower end of the hopper D, facing the furnace A, forms a chamber the walls of which are partly curved in cylindrical shape. This chamber is connected with the furnace-chamber A by a discharge-orifice *a*, preferably in the shape of a slot, and in the said chamber is rotatably arranged the conveying-brush E, preferably made of stiff but resilient wire. The wire may either uniformly cover the surface of the roller constituting the core or body of the brush and whose diameter may vary according to requirements, or it may be arranged upon such roller spirally when it is desired that the revolving brush should answer the double object of distributing the coal-dust and conveying it to the discharge-orifice in longitudinal direction. The main purpose of the brush E, however, when rotating in the direction of the arrow with moderate speed is to continuously sweep the coal-dust introduced through the hopper over the discharge-orifice into the furnace-chamber.

The hopper is closed at the back by a movable or hinged plate *d*, which only opens the passage through the orifice of the hopper when it is slightly moved backward or turned out of the way. The closing is effected by springs *f f*, which engage with arms *u*, projecting on the outside of the hopper-case and carrying tappets *v*. These arms pass through slots *u'*, provided for the purpose in the corresponding walls or checks of the case, within which they are connected to the vibrating or shaking plate. The said tappets *v* are also acted upon by cams *q*, keyed onto the driving-shaft *p* of the revolving brush and having one or more projections or tappets arranged so that when rotated in the direction of the arrow, Fig. 2, the plate *d* is temporarily removed from the position from which it closes the passage, and the coal-dust passes over the plate *s*, curved to suit the periphery of the brush E and conveying the fuel to the bottom of the brush-case. This is to prevent the coal-dust from collecting in the brush and impeding its operation by reducing its elasticity. The coal-dust therefore collects at the bottom of the brush-case in a loose heap and is readily swept into the furnace by the rotating brush E. When, however, the tappets *v* slide off the cam-surfaces, the said plate *d*, under the action of the springs *f*, instantly swings back to the closing position and in so doing imparts a shock to the mass of coal-dust contained in the hopper. The object of this mode of operation, which is shown in detail in Fig. 3, is to counteract the tendency of the coal-dust to agglomerate and form clots or lumps, especially under the influence of dampness, so that the revolving brush may at all times convey into the furnace uniform supplies of pulverulent fuel, the brush itself, moreover, contributing to separate particles of fuel adhering to each other.

Experiment has actually shown that with the assistance of the vibrating device just described or other similar shaking or rocking arrangement the brush more thoroughly takes hold of the material to be conveyed than it would otherwise do, and consequently effects a more uniform and reliable feeding action. By thus combining a shaking device with the improved fuel-conveying brush a further disadvantage attending the coal-dust furnaces hitherto known is also effectually removed. This disadvantage is that the coal-dust, forced by steam or air under pressure into the old apparatus of this class, has to go through an elaborate drying stage before it can be lighted, and, further, that even in spite of such drying the hygroscopic nature of the material renders the absorption by it of a certain amount of moisture unavoidable, and therefore its even distribution is practically impossible. In the present arrangement, however, the distribution of the fuel is effected automatically no matter whether the fuel is introduced into the hopper in the condition of dry dust or in lumps.

Fig. 1 shows the air-chamber J, in front of the hopper D, provided with a damper *i*, whereby the passage of the air from the said chamber to the upper part of the furnace may be controlled. The admission of air below the discharge-orifice *a* is also controllable by means of a hinged plate or door *k*, adjustable on the system of a ventilating-valve and adapted to form an opening of greater or less width, so that the air may pass through and rise in regulated quantities under the pulverulent material. A chamber L, formed between the rear wall of the hopper-casing and the vibrating plate, is fitted with another damper *l*, whereby the admission of air into the brush-case may be controlled and the case itself protected from undue heating.

Having now particularly described and ascertained the nature of this invention, I declare that what I claim, and wish to secure by Letters Patent, is—

1. A feeding apparatus comprising a hopper, a brush-casing with a delivery-opening, a shaking device above the brush-casing with means for actuating the same, and a rotary brush in said casing adapted to act on the material released by said shaking device, substantially as described.

2. An apparatus for feeding coal-dust, consisting of a hopper, a shaking plate adapted to jar the mass of coal-dust and to alternately confine and release such dust, a casing communicating with the hopper and having a delivery-opening and a rotary brush journaled in said casing, and adapted to sweep away charges of material released from said hopper, substantially as described.

3. In an apparatus for feeding coal-dust, the combination with a furnace of a hopper, a spring-actuated vibrating plate placed therein, and a revolving shaft provided with devices for operating said plate, combined with a suitable inclosing frame, and a revolving brush placed therein for sweeping the particles of coal into the furnace, substantially as described.

4. In an apparatus for feeding coal-dust, the combination with a furnace of a hopper, a vibrating spring-plate placed therein, and a mechanism for operating it, combined with an inclosing frame for the brush having a delivery-opening to the furnace, a revolving brush placed therein, and a hinged plate or door for controlling the admission of air to the furnace, substantially as set forth.

In witness whereof I have hereunto signed my name in the presence of two subscribing witnesses.

GEORG HILLIGER.

Witnesses:
ARTHUR BAERMANN,
GUSTAV TAUER.